United States Patent [19]

Peash et al.

[11] 4,351,501
[45] Sep. 28, 1982

[54] RAM AIR ENHANCED RELIEF VALVE

[75] Inventors: Douglas E. Peash, Enumclaw; Arthur S. Yorozu, Seattle, both of Wash.

[73] Assignee: The Boeing Company, Seattle, Wash.

[21] Appl. No.: 95,759

[22] Filed: Nov. 19, 1979

[51] Int. Cl.³ .............................................. B64D 13/04
[52] U.S. Cl. ............................ 244/129.1; 244/118.5; 98/1.5; 251/212; 137/614.11; 49/21
[58] Field of Search ............... 244/118.5, 129.1, 129.4, 244/129.5, 1 R, 57; 114/183 R, 185, 198; 49/21, 116; 251/282, 250, 212; 137/613, 614.11, 614.19, 614.21, 614.15; 98/1.5, 118

[56] References Cited

U.S. PATENT DOCUMENTS

| | | | |
|---|---|---|---|
| 778,204 | 12/1904 | Porter | 98/118 |
| 1,417,165 | 5/1922 | Grieshaber | 137/614.11 |
| 1,761,061 | 6/1930 | Van Zile | 98/118 |
| 1,761,645 | 6/1930 | Sobolew | 114/185 |
| 2,399,326 | 4/1946 | Crof | 98/1.5 |
| 2,748,855 | 6/1956 | Siems et al. | 244/129.5 |
| 2,954,205 | 9/1960 | Musser | 251/212 |
| 3,107,080 | 10/1963 | Priese | 251/250 |
| 3,804,353 | 4/1974 | Scott et al. | 244/57 |

*Primary Examiner*—Galen L. Barefoot
*Attorney, Agent, or Firm*—Morris A. Case; Bernard A. Donahue

[57] ABSTRACT

A relief valve has a pair of poppet valves mounted to seal against each other when in the closed position and to uniformly move apart when opening to place one of the poppet valves outside configuration on an aircraft to create a ram air effect through the opened valve.

12 Claims, 5 Drawing Figures

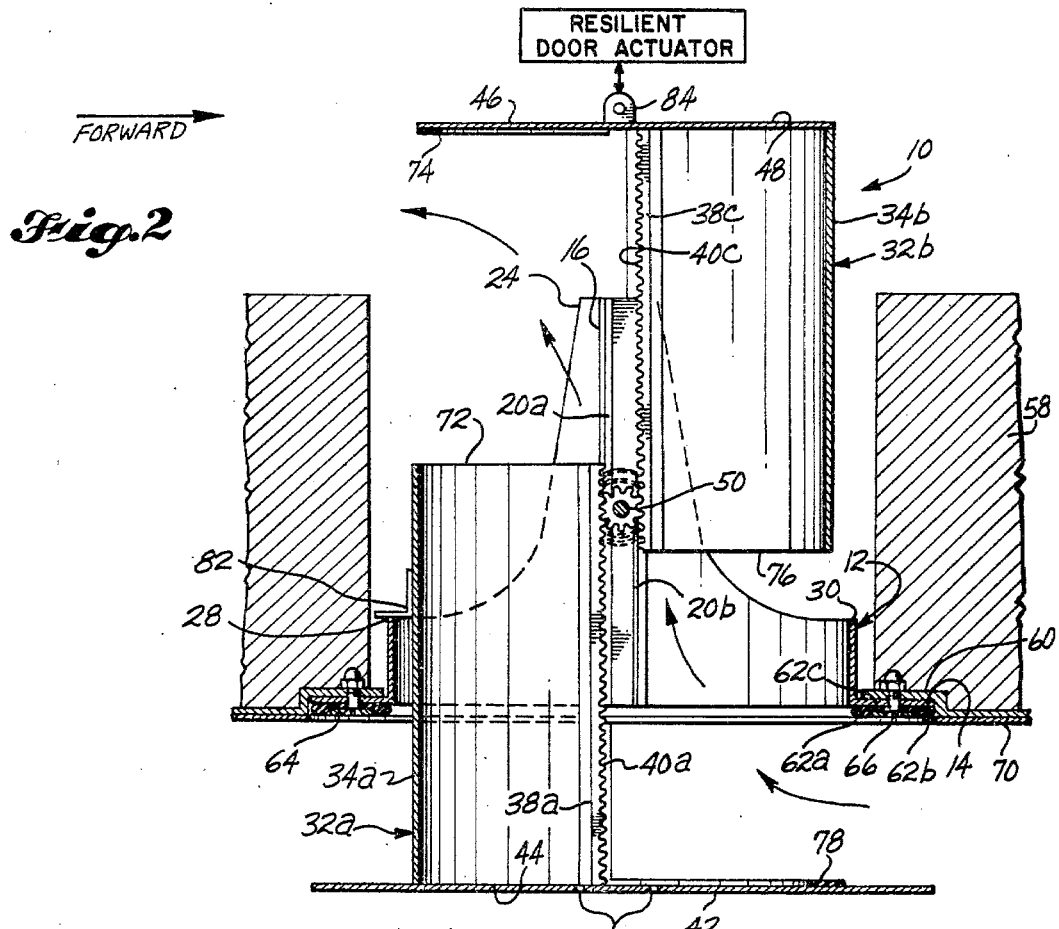
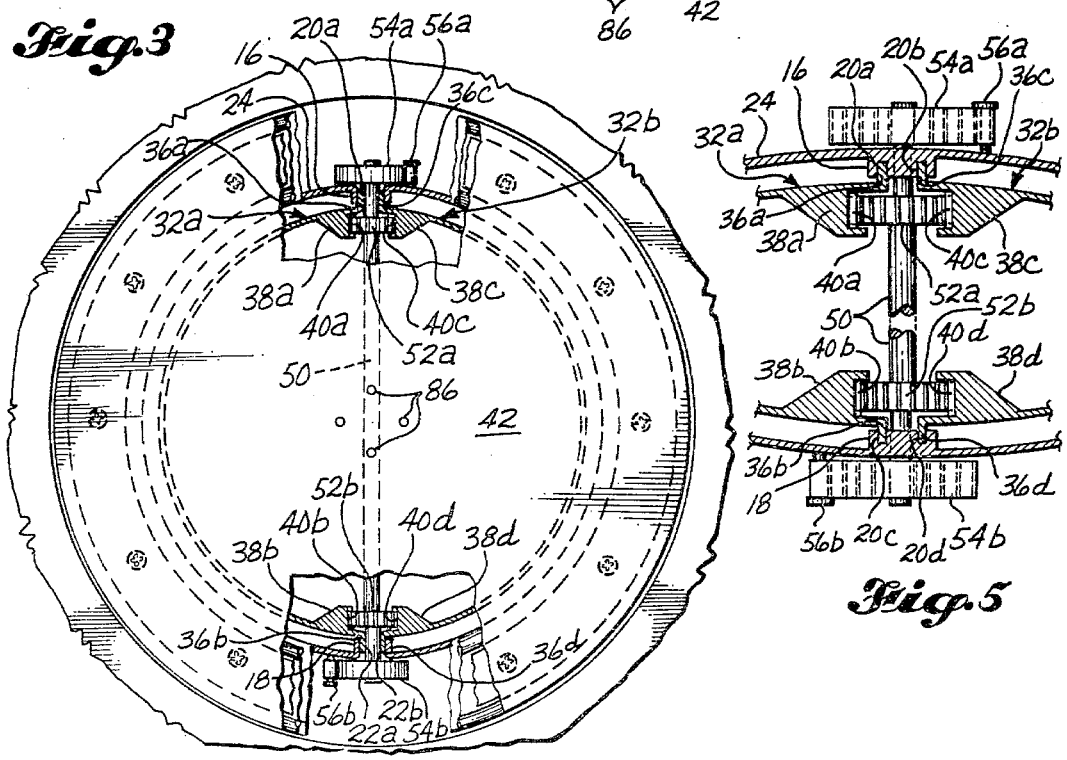

RAM AIR ENHANCED RELIEF VALVE

BACKGROUND OF THE INVENTION

It is required on an aircraft to have reverse pressure differential relief valves to automatically prevent a negative pressure differential that would damage the structure. It is normal to use a skin-mounted valve that opens inwardly. The valves are sized for an unpressurized condition, no inflow, and maximum aircraft descent. The valves require a relatively large geometric area, due to a low flow coefficient through the valve, and as the weight of the valve installation is proportional to the size of the pressure shell cut-out, it makes for a relatively heavy valve. The saving of weight is a continuing consideration in the design of aircraft. With the advent of the wide body aircraft, the pressurized volume has increased, negative pressure relief area requirements of valves has increased, and this calls for a heavier valve for negative pressure relief. It has been found that a cooperating double poppet valve will provide a negative pressure relief valve for aircraft that will effect considerable weight savings.

U.S. Pat. No. 2,748,855 to Siems et al provides for blow-out safe aircraft cargo doors that prevent accidental release of the doors in flight. The doors have relief valves that must be opened to equalize pressure on both sides before the door can be opened.

U.S. Pat. No. 2,815,705 to Jensen calls for a butterfly type valve on an aircraft that provides pressure relief, vacuum relief, and also acts as a dump valve.

SUMMARY OF THE INVENTION

A negative pressure relief valve uses a pair of poppet valves mounted to coact, in response to negative pressure inside an aircraft, by simultaneously moving apart as the valves open and create a ram air pressure through the valves due to one of the poppet valves moving outward into the aircraft slip stream.

It is an object of this invention to provide a low weight negative pressure relief valve for an aircraft.

It is another object of this invention to provide a pressure relief valve for an aircraft that will remain closed when submerged in water.

DESCRIPTION OF THE DRAWINGS

FIG. 2 shows the valve of FIG. 1 while in the open position.

FIG. 3 shows a partially sectionalized view of the valve of FIG. 1 looking toward the valve from outside the door.

FIG. 5 shows a blown-up view of the sectionalized part of FIG. 3.

DETAILED DESCRIPTION

Figure 4:
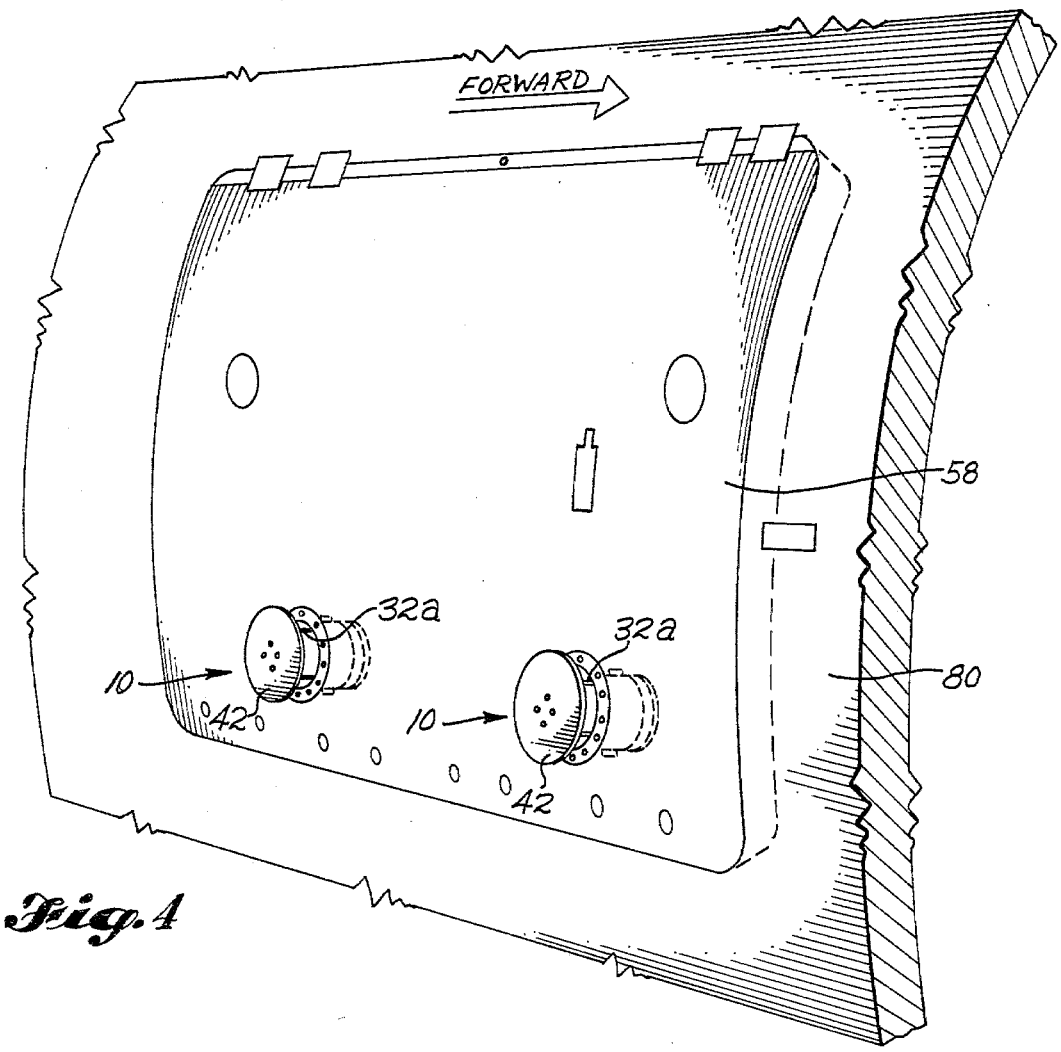
FIG. 4 shows a fragmented perspective view of a section of an aircraft with a pair of valves as in FIG. 2 mounted to a door.
Figure 1:
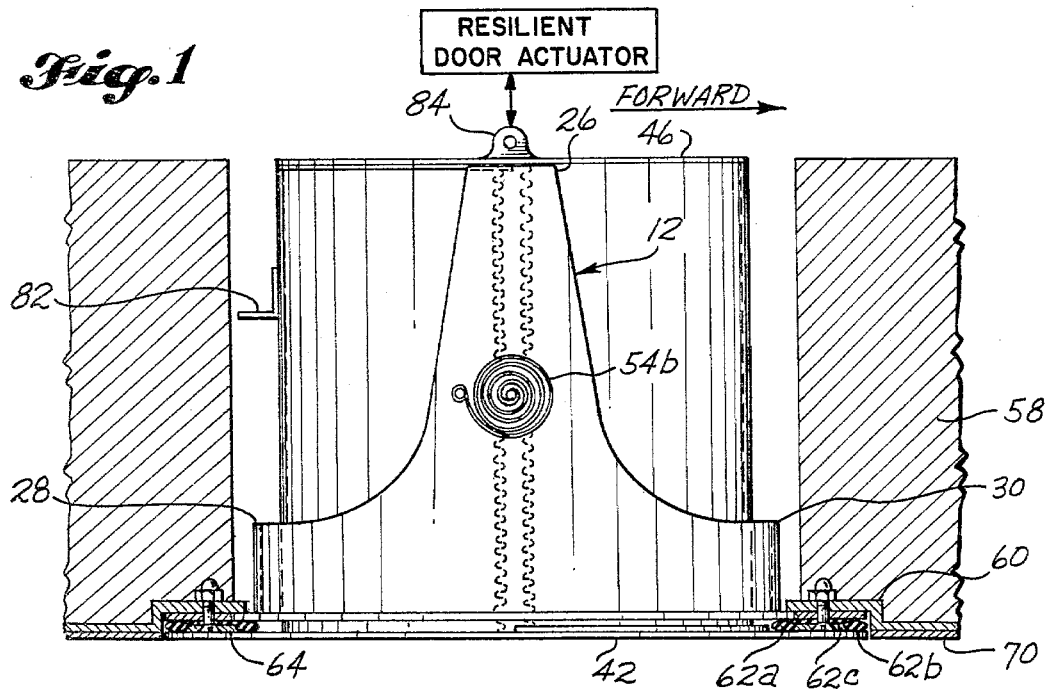
FIG. 1 shows a side view of the valve of this invention in the closed position and mounted to a door of an aircraft.

Relief valve 10 has a valve housing 12 that is tubular in shape with one end of the tubing having a radially outward extending flange 14. The housing has a pair of facing projections 16 and 18, each of which extends in an axial direction along the inside length of the tubing portion of the housing. Projection 16 has a pair of lengthwise parallel slots 20a and 20b, and projection 18 has a pair of facing lengthwise parallel slots 22a and 22b. In this embodiment, and for the purpose of saving weight, the tubular portion of the housing only extends for the full length at 24 and 26 to provide support for the projections 16 and 18, and is cut away down to points 28 and 30.

The valving is accomplished with a pair of poppet type valves 32a and 32b. The outer poppet 32a has an essentially semi-circular tubular section 34a with radially outward extending lengthwise edges 36a and 36b that mate with and form a sliding seal in recesses 20a and 22a respectively. The seal may be accomplished with any of the many known sealing methods with a preferred method using a close tolerance fit and a teflon coating on edges 36a and 36b. Adjacent the lengthwise edges and extending inwardly are projections 38a and 38b each of which has a series of serrations 40a and 40b respectively to act as a rack. A disk 42 is integrally joined to the outer end 44 of the semi-circular tubular member with the disk of larger diameter than the tubular member and located to have a common axis. The inner poppet valve 32b has a facing essentially semi-circular tubular member 34b that has radially outward extending lengthwise edges 36c and 36d that mate with and form a sliding seal in recesses 20b and 22b respectively, and inwardly extending projections 38c and 38d with serrations 40c and 40d respectively to act as a rack. A disk 46 is integrally joined to the inner end 48 of the semi-circular tubing, has a larger diameter than the tubing, and is located to be concentric with the tubing.

A shaft 50 sealingly extends radially through the lengthwise center of the tubular part 12 of the housing. A pair of pinion gears are joined to the shaft with pinion 52a located to mesh with racks 40a and 40c, and pinion 52b located to mesh with racks 40b and 40d. A pair of coiled springs are joined to the shaft with spring 54a also joined to the outside of the housing with a pin 56a, and spring 54b joined to the shaft and also joined by pin 56b to the outside of the housing.

The housing with poppet valves is joined to an aircraft door 58. Flange 14 is pressed against a structurally reinforcing member 60. Next a ring of a resilient material is placed against the flange. This ring 62 consists of an inner and outer portion 62a and 62b each essentially O-ring in shape and joined together with integral member 62c. A flat metal collar 64 presses against the flat portion 62c of the resilient member and flat head screws 66 in combination with domed nut plate 68 fastens the valve housing to the door with seal 62 in place. The reinforcing member is shaped to place the outer surface of disk 42 flush with the exterior surface 70 of the door when the two poppet valves are in the closed position. When in the closed position the inside end 72 of the outer poppet valve 32a seals against a resilient elastomeric material 74 which may be located on end 72 but is preferably joined to the disk 46, and the outside end 76 of the inner poppet valve 32b seals against a resilient material 78 which is joined to disk 42. When the valves are in the closed position the disk 42 is simultaneously sealed by resilient material 62. The resilient materials may be any of the well known elastomeric polymers such as but not limited to fluorosilicone.

In operation valves 10 are mounted to a cargo door 58 in an aircraft body section 80. When the door is closed but not latched the coiled springs 54a and 54b act to extend the valves to the open position. The racks and pinions are located such that the inner and the outer poppet valves are moved an equi-distance away from the closed position with the outer valve extending outside contour of the door. The travel of the valves is limited by stop 82, which is joined to the outer periphery of the semi-tubular part 34a of the outer valve 32a and the stop abuts surface 28 of the valve housing 12. A connector 84 is joined to disk 46, and when the door is being latched it simultaneously moves an actuator 85, not shown but symbolically labeled, to overcome springs 54a and 54b, move the valves to the closed position, and resiliently hold the valves closed. A series of holes 86 are located in disk 42. This permits atmospheric access through the disk to allow ambient-to-interior differential pressure to occur across the inner poppet valve. In flight the aircraft is pressurized which keeps the valve closed. During an unpressurized and a rapid descent the increased ambient pressure on the inner poppet valve forces the valve open to relieve the pressure differential and prevent damage to the aircraft structure. As the valve opens the outer poppet valve moves outward into the aircraft slip stream to give a ram air effect to the inward movement of air into the aircraft. The disk of the outer poppet valve is larger than the disk of the inner poppet valve to provide a net closing force and to prevent valve opening if the valve is submerged during ditching at sea.

We claim:

1. A negative pressure relief valve for an aircraft mounted to be resiliently closed by an aircraft door latching mechanism, wherein the valve comprises: an outer poppet type valve located, when in the closed position, to blend into an outer contour of an aircraft, an aligned inner poppet type valve, means for moving the closed outer valve outward to direct the aircraft slip stream in a ram effect through the valve while simultaneously moving the closed inner valve inward to permit the ram air to flow inside the aircraft all in response to a negative pressure across the inner valve wherein the means for simultaneously moving the inlet and outlet valve, in response to the negative pressure across the inner valve has vent holes through the outer valve to permit outside pressure to act against the inner valve, and rack and pinion means between the structural support part of the inner and the outer valves to control relative movement between the two valves.

2. A negative pressure relief valve as in claim 1 wherein the cross sectional area of the outer valve is greater than the cross sectional area of the inner valve.

3. A negative pressure relief valve for an aircraft mounted to be resiliently closed by an aircraft door latching mechanism, wherein the valve comprises: an inner poppet valve having a semi-circular tubular member joined at an inboard end to a concentric disk having a larger diameter, an outer poppet valve having a facing semi-circular tubular member joined at an outboard end to a vented concentric disk having a larger diameter, means for sealing between the two valves, a valve housing mounted to an outer wall of an aircraft, means for supporting and for sealing the valves to the housing along each lengthwise edge, and means for holding the two valves in a contacting closed engagement and for simultaneously moving the valves apart in response to negative air pressure across the inner valve to permit airflow through the valves.

4. A negative pressure relief valve as in claim 3 further comprising: supporting the valves in a location such that in the closed position the disk of the outer poppet valve replaces a portion of and blends into the contour of the outer skin of the aircraft and extends outside the contour when in the open position to move into the aircraft slip stream to provide a ram air effect through the opened valve.

5. A negative pressure relief valve as in claim 4 wherein the disk in the outer poppet valve is larger than the disk of the inner poppet valve and when in the closed position the larger disk has a seal means near the outer periphery.

6. A negative pressure relief valve as in claim 3 wherein the means for supporting and for sealing the valves along the lengthwise edge comprises: the housing having U-shaped radially inward extending projections, and each lengthwise edge of the valves having a mating radially outward extending bearing projection.

7. A negative pressure relief valve as in claim 6 wherein the means for holding the two valves in contacting closed engagement and for simultaneously moving the valves apart comprises: a reinforced rack attached to and extending parallel with each lengthwise edge, a shaft mounted to the housing that extends radially between the semi-tubular members, a pair of pinions mounted to the shaft and located to mesh into the racks, and a spring extending from each end of the shaft to the housing to continually urge the valves apart.

8. A negative pressure relief valve as in claim 7 wherein the springs are coiled springs.

9. A negative pressure relief valve as in claim 7 further comprising: supporting the valves in a location such that in the closed position the disk of the outer poppet valve replaces a portion of and blends into the contour of the outer skin of the aircraft, and extends outside the contour when in the open position to move into the aircraft slip stream to provide a ram air effect through the opened valve.

10. A negative pressure relief valve as in claim 9 wherein the disk in the outer poppet valve is larger than the disk of the inner poppet valve and when in the closed position the larger disk has a seal means near the outer periphery.

11. A negative pressure relief valve as in claim 3 wherein the means for sealing between the two valves comprises: a resilient material located between the outer end of the inner poppet valve and the disk of the outer valve, and a resilient material located between the inner end of the outer poppet valve and the disks of the inner valve.

12. A negative pressure relief valve as in claim 11 wherein the resilient material is joined to the disks.

* * * * *